Figure 1:
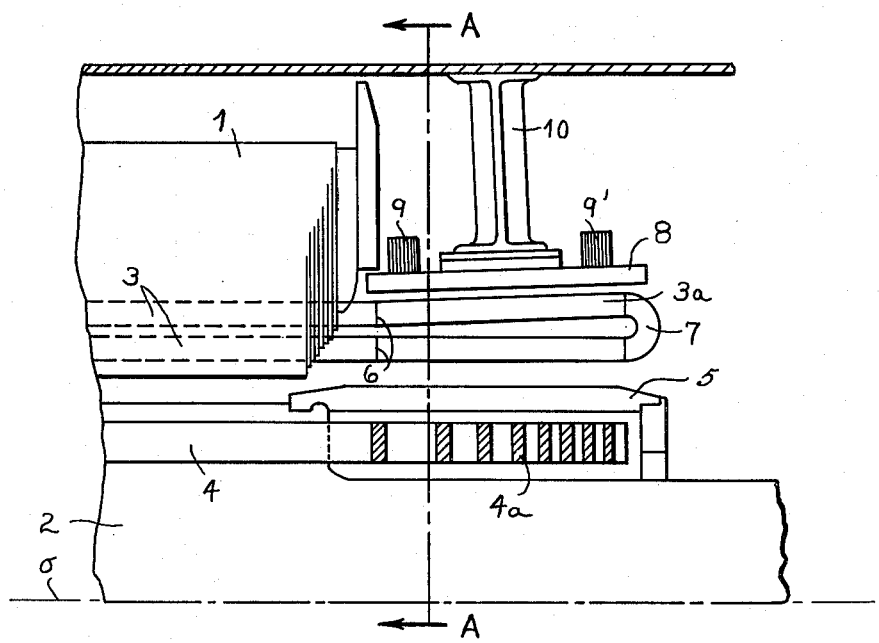

INVENTORS
Georges Darrieus
Friedrich Müllner

BY Pierce, Scheffler & Parker
ATTORNEYS

Aug. 6, 1963    G. DARRIEUS ETAL    3,100,271
ALTERNATING CURRENT MACHINE WITH MAGNETIC SHIELD
ENCLOSING END TURNS OF STATOR WINDING
Filed April 27, 1961    2 Sheets-Sheet 2

INVENTORS
Georges Darrieus
Friedrich Müllner
BY Pierce, Scheffler & Parker
ATTORNEYS 3,100,271
ALTERNATING CURRENT MACHINE WITH MAGNETIC SHIELD ENCLOSING END TURNS OF STATOR WINDING
Georges Darrieus, Houilles, France, and Friedrich Müllner, Mannheim, Germany, assignors to Aktiengesellschaft Brown, Boveri & Cie, Baden, Switzerland, a joint stock company
Filed Apr. 27, 1961, Ser. No. 124,744
Claims priority, application Switzerland May 20, 1960
4 Claims. (Cl. 310—256)

The present invention relates to dynamo-electric machines of the alternating current type commonly referred to as alternators and more particularly to an improved construction for magnetically shielding the end turns of the stator and rotor windings.

Among the methods which permit a reduction of additional losses in the head zones of large alternators, particularly turbo-generators, one of the most effective is the provision of magnetic shielding. If these shields are suitably arranged in space, they conduct away the leakage flux starting from the end turns of the coils or windings, and prevent formation of additional losses in the more massive structural parts of the machine.

Among the various types of construction employed for magnetic shielding, that in which the shields are arranged directly above the end turns of the coils externally of the cone formed by the end turns is of particular interest. They thus limit radial spreading of the leakage flux and bring the more massive parts, such as the pressure plates at opposite ends of the stator and the coil support, into a field-free zone.

A closer study of the field distribution by graphic or measuring means shows, however, that the provision of magnetic shields increases the leakage flux and hence also increases the additional losses produced in the end turns of the coils themselves. Another important factor in the dimensioning of the magnetic shields is the magnitude of the total flux. According to the total flux, the cross-section of the magnetic shield must be so dimensioned that saturation of the leakage plates does not occur.

The object of the present invention is to reduce the magnitude of the leakage flux, despite the use of magnetic shielding, and to simplify construction of the shields and their mode of attachment in place on the alternator. Due to the reduction of leakage flux, it is then possible to reduce the cross-section and weight of the packets of laminations which are used to form the shields.

In accordance with the invention, the desired results are obtained by arranging the end turns of the stator coils in an essentially cylindrical array concentric with the machine axis so as to bring them as closely as possible to the similar cylindrical array of the end turns of the rotor, and surrounding the cylindrical array of stator end turns with an essentially cylindrical magnetic shield constituted by closely adjacent sheet iron laminations, the individual laminations extending longitudinally of the machine axis and being arranged in essentially radial planes passing through the machine axis.

Due to this construction according to the invention, the current-carrying end turns of the stator and rotor are then comparable to a transformer the leakage of which is reduced by the fact that the primary winding is brought as close as possible to the secondary winding. It is then also advantageous, as is customary in transformers of conventional construction, to make both windings of equal length in an axial direction, i.e. to extend the end turns of the rotor in the direction of the axis of the alternator until they reach approximately the same axial length of the flatly projecting end turns of the stator. But while in a transformer, the linear current density is usually constant over the entire coils, such density in an alternator becomes increasingly greater starting from the iron toward the tip of the end turn. For this reason, the distribution of the end turns of the rotor is so designed that it corresponds to the spatial distribution of the stator ampere-turns.

In such arrangements of the end turns of the stator and rotor coils, the greater part of the leakage flux extends axially between the two coils in an annular gap which constitutes an extension in space of the air gap between the stator and rotor elements of the alternator. The grounding of this leakage flux is externally through the shields and internally through the shaft of the rotor.

With an axial extension of the end turns of the rotor, there is also involved a corresponding extension of the non-magnetic cap which holds these end turns. However, as the weight of the end turns of the rotor increases less than proportionally with the length of the axial extension, the extended rotor cap may, in this case, be designed thinner in the radial direction than is customary for conventionally constructed, relatively shorter length, end turns.

Figure 2:
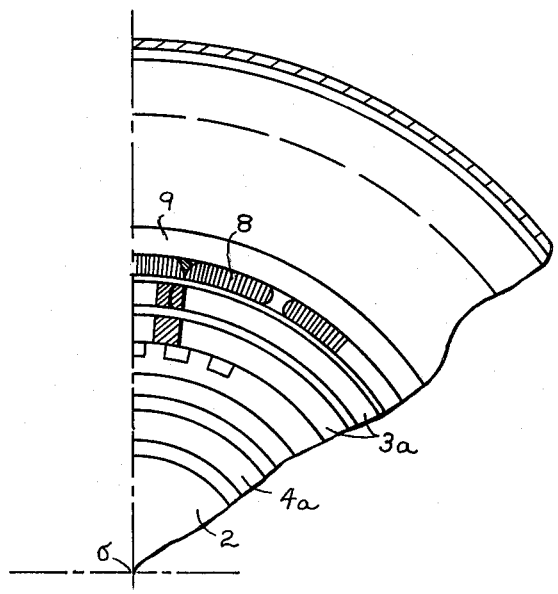

In the accompanying drawings which illustrate the invention, one embodiment thereof is depicted in FIGS. 1 and 2. FIG. 1 is a partial longitudinal axial section of one end of the alternator showing the end turns of the stator and rotor elements, and the magnetic shielding surrounding the end turns of the stator. FIG. 2 is a partial transverse section taken on line A—A of FIG. 1.

Figure 3:
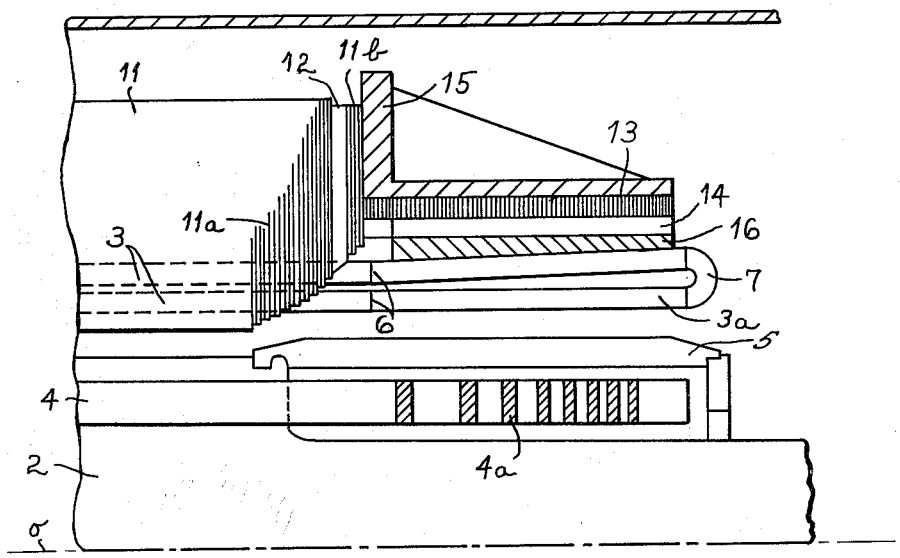
Figure 4:
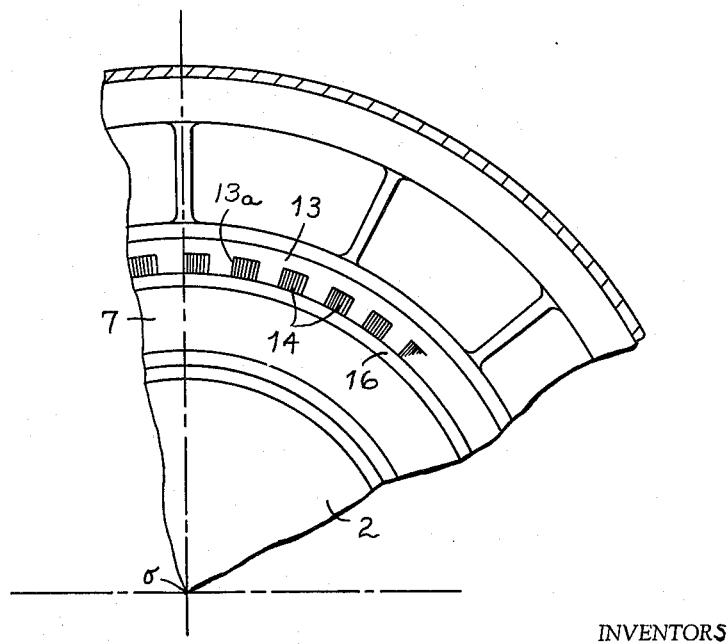

A second embodiment of the invention is depicted in FIGS. 3 and 4, these being longitudinal and transverse views, respectively similar to those of FIGS. 1 and 2.

With reference now to the embodiment of FIGS. 1 and 2, the stator element of the alternator is denoted by numeral 1 and the laminations from which it is constructed have been indicated somewhat schematically at 1a. The rotor is indicated at 2. The end turn portions of the coils 3 carried by the stator 1 are indicated at 3a and the end turn portions of the coils 4 carried by the rotor are indicated at 4a. The rotor cap placed over the end turns of the rotor is designated by 5. At points 6 indicated on the drawing, the straight axially extending portions of the conductor bars 3 of the stator coils bend to form the offset end turn portions 3a; point 7 designates a 180° conductor section which joins the upper and lower conductor bars of each of the end turns. As is evident from an inspection of FIG. 1, the spacing between succeeding end turns 4a of the rotor coil is non-uniform and becomes increasingly smaller with increasing extension, i.e. to the right as viewed in FIG. 1. The end turns 3a of the stator coils establish an essentially cylindrical array of conductor portions concentric with the axis o of the alternator and the end turns 4a of the rotor also establish an essentially cylindrical array of conductor portions likewise concentric with the alternator axis o.

The essentially cylindrical magnetic shield surrounding the essentially cylindrical array of end turns 3a of the stator is composed of packets of magnetically conductive laminations 8. These laminations 8 extend longitudinally of the machine axis o and it will be seen that they are arranged in essentially radial planes which pass through the axis o of the alternator. The laminated packets 8 are secured in place between the end turns 3a and stationary supporting structure 10 of the alternator. If pins or other structural parts passing through the end turns of the coil are used for their better attachment, adequate circumferential spacing between the individual lamination packets 8, must be provided, as is visible from FIG. 2. And in order to prevent additional losses at the sides of these packets 8, these should be rounded accordingly as is also shown in FIG. 2.

In addition to the magnetic fields extending in meridian planes, i.e. the planes containing the laminations of the magnetic shield packets 8, there is also produced a certain proportion of circularly extending magnetic fields in planes normal to the axis of the alternator. This portion of the magnetic field is strongest over the straight portion of the conductor bars, issuing from the grooves, but decreases sharply in the actual end turn portion of the coil, so that for their elimination, it suffices to provide one or two laminated rings 9, 9' of smaller cross-section in the direction of the axis over the parallel lamination packets 8.

The laminations which make up the rings 9, 9' are stacked together in planes transverse to the longitudinal axis of the alternator. In FIG. 1, one of these laminated rings 9 lies on one side of support structure 10 and the other ring 9' lies on the opposite side of that structure.

In the modified embodiment of the invention as shown in FIGS. 3 and 4, the stator is indicated at 11. The laminations of the principal body portion of the stator are indicated at 11a, and the endmost laminations 11b of the stator are separated from those of the main body portion by a layer of non-magnetic pressure fingers 12. For applying axial compression to the stator laminations 11a, 11b, a conventional annular press plate 15 is used and a similar construction is employed at the opposite end of the stator. The plate 15 may be made of normal magnetic steel since it lies outside of the shielding in a completely field-free zone. The magnetic shielding is comprised of a packet of annular laminations 13, the planes of which are arranged transverse to the axis of the alternator. The annular laminated packet 13 is provided with circumferentially spaced grooves 13a which open in a radially inward direction and each of these grooves is filled with an insulated packet of laminations 14 all of which extend longitudinally of the alternator axis and lie in meridian planes, i.e. planes passing through the axis o of the alternator. The laminations 14 correspond in arrangement and function to the laminations 8 of the embodiment of FIGS. 1 and 2, and hence serve to intercept the leakage flux in meridian planes. The annular laminated packet 13 which extends in an axial direction for the length of the end turns 3a of the stator coil serves to absorb the tangentially directed leakage flux and also serves as a support for the laminated packets 14. Together with the laminated packets 14, the comparatively wide annular laminated packet 13 constitute a shield which encloses all of the end turns 3a and which intercepts the leakage flux components which flow in meridian as well as circular directions, so that the zone there behind becomes free from loss-bringing leakage flux. Besides the magnetic effect, the embodiment of the invention according to FIGS. 3 and 4 permits a satisfactory attachment for the axial packets in relation to the vibrational forces produced by the fluxes. At the same time, in this latter embodiment, an external support for the end turns 3a becomes unnecessary because of the use of a sleeve of insulation 16 between the end turns 3a and the inner periphery of the annular laminated packet 13 which is able to transmit radially outward forces imposed upon the end turns 3a directly to the annular shield 13 which in turn is held in place by the inner periphery of the annular press plate and sleeve structure 15.

We claim:

1. In an alternating current machine the combination comprising a rotor element and a stator element surrounding said rotor element, said stator and rotor elements being provided with coils thereon having straight conductor portions extending axially of the machine and end turns projecting beyond the ends of said straight conductor portions, the end turns of said stator element and of said rotor element being arranged in essentially cylindrical arrays of conductor portions, a first essentially cylindrical magnetic shield surrounding said essentially cylindrical array of conductor portions forming the end turns of said stator element, said shield being constituted by closely adjacent laminations extending longitudinally of the machine axis and being arranged in essentially radial planes passing through the machine axis, and a second magnetic shield constituted by closely adjacent annular laminations surrounding said first magnetic shield, the laminations of said second shield being disposed in planes transverse to the machine axis.

2. An alternating current machine as defined in claim 1 wherein said first essentially cylindrical magnetic shield is constituted by packets of laminations having a slight circumferential spacing therebetween.

3. An alternating current machine as defined in claim 1 wherein said second magnetic shield is constituted as a cylinder of annular laminations disposed in planes transverse to the machine axis, said cylinder of annular laminations including a plurality of axially extending circumferentially spaced grooves opening in a radially inward direction, and the laminations of said first magnetic shield being arranged in the form of packets in said grooves.

4. An alternating current machine as defined in claim 1 wherein the end turns of said rotor element are extended in an axial direction so as to establish an axial length substantially equal to that of the end turns of said stator element, the distribution of said end turns of said rotor element being determined in accordance with the spatial distribution of the stator ampere turns.

References Cited in the file of this patent
UNITED STATES PATENTS
1,689,188    Pohl et al. _____ Oct. 23, 1928